United States Patent
Krebs et al.

(10) Patent No.: US 6,493,634 B1
(45) Date of Patent: Dec. 10, 2002

(54) METHOD FOR DETERMINING STACKING VELOCITY PARAMETERS OR OTHER REFLECTION GEOMETRY INFORMATION FROM SEISMIC GATHER DATA USING MULTIPLE ATTRIBUTES AND 3-D VISUALIZATION

(75) Inventors: Jerome R. Krebs, Houston, TX (US); Lorie K. Bear, Stafford, TX (US)

(73) Assignee: ExxonMobil Upstream Research Company, Hosuton, TX (US)

(*) Notice: Subject to any disclaimer, the term of this patent is extended or adjusted under 35 U.S.C. 154(b) by 0 days.

(21) Appl. No.: 09/566,296

(22) Filed: May 5, 2000

Related U.S. Application Data

(60) Provisional application No. 60/134,302, filed on May 14, 1999.

(51) Int. Cl.⁷ .................................................. G01V 1/28
(52) U.S. Cl. ........................................... 702/14; 702/16
(58) Field of Search ............................... 702/14, 16, 17, 702/18; 367/21, 24, 38, 53, 68, 73

(56) References Cited

U.S. PATENT DOCUMENTS

| | | | | |
|---|---|---|---|---|
| 4,984,220 A | | 1/1991 | Bodine et al. ................. | 367/68 |
| 5,008,861 A | * | 4/1991 | Gallagher ..................... | 367/38 |
| 5,450,371 A | * | 9/1995 | MacKay ....................... | 367/27 |
| 5,532,976 A | * | 7/1996 | Schneider, Jr. ............... | 367/38 |
| 5,930,730 A | * | 7/1999 | Marfurt et al. ............... | 702/16 |
| 5,966,672 A | * | 10/1999 | Knupp ......................... | 702/16 |
| 6,055,482 A | * | 4/2000 | Sudhakar et al. ............. | 702/16 |

FOREIGN PATENT DOCUMENTS

| | | | |
|---|---|---|---|
| GB | 1 399 904 | 7/1975 | ............ G01V/1/28 |

OTHER PUBLICATIONS

Doicin, D., Johnson, C., and Hargreaves N. "*Improved 3D Procesing Turnaround Via Automatic Velocity Picking,*" EAGE 57th Conference and Technical Exhibit, Glasgow, Scotland (May 29–Jun. 2, 1995, EAEG Division, Extended Abstracts, vol. 1, Paper No. BP33.

Jones, I.F., Baud, H., and Ibbotson, K. "Continuous 3–D preSDM velocity analysis," *The Leading Edge,* (Mar. 2000) pp. 263–269.

* cited by examiner

*Primary Examiner*—Edward Lefkowitz
*Assistant Examiner*—Anthony Gutierrez
(74) *Attorney, Agent, or Firm*—J. Paul Plummer

(57) ABSTRACT

A method for constructing velocity models for stacking seismic data, or, more generally, a method for determining reflection geometries with seismic gathers through the use of trace-to-trace coherency coupled with global editing capability to separate velocity events corresponding to primary reflections from multiple reflections and other noise. A velocity model can be fit to the edited velocity events and used for stacking of seismic data. Alternatively, the measured reflection geometry has other potential uses including providing data to be input to a tomographic velocity updating procedure that produces a migration velocity model.

19 Claims, 3 Drawing Sheets

METHOD FOR DETERMINING STACKING VELOCITY PARAMETERS OR OTHER REFLECTION GEOMETRY INFORMATION FROM SEISMIC GATHER DATA USING MULTIPLE ATTRIBUTES AND 3-D VISUALIZATION

This application claims the benefit of U.S. Provisional Application No. 60/134,302 filed May 14, 1999.

FIELD OF THE INVENTION

This invention relates generally to the field of seismic data processing, and specifically to determining reflection geometry in seismic gather data. This information can be used to determine stacking velocity parameters.

BACKGROUND OF THE INVENTION

In seismic data processing, different pieces of data (time samples from seismic traces) presumed to originate from the same location on a subsurface reflector are combined, or stacked, to enhance the amplitude of desired reflected information relative to noise. This process of stacking requires a parameter, called the stacking velocity, which describes the change in traveltime of the reflected energy as a function of the distance between the seismic source and receiver. This stacking velocity somehow must be selected (or "picked") throughout the subterranean spatial region represented in the seismic survey. Picking stacking velocities for seismic data is often the most time consuming portion of seismic data processing.

Existing methods for picking stacking velocities consist of first producing velocity semblance, velocity sweep, or velocity events displays at each velocity analysis location in the survey. A brief description of each of these types of display follows:

Velocity Semblance Display

To produce a velocity semblance display, one first measures the trace-to-trace coherence (or coherency), within a common midpoint (CMP) gather of seismic traces, as a function of both moveout velocity and time. This coherency data may be plotted, on a computer monitor for example, as an image with time (or depth) as the vertical axis, velocity as the horizontal axis, and with the pixel color spectrum used as a measure of the coherency value. Peaks in this coherency, as a function of time and velocity, are taken to be potential points on the velocity versus time (or depth) function at the x-y position of that common midpoint. The coherency peaks are assumed to represent subterranean reflectors or horizons, and the time (or depth) value for each peak represents the zero-offset travel time (or depth) of the horizon at that x-y position.

The coherency can be computed using a number of methods. Common methods include simply moveout correcting the traces and computing the trace-to-trace semblance.

Velocity Sweep Display

A velocity sweep is a stack, of several adjacent CMP gathers, for a suite of different stacking velocities. The stacks, of several adjacent CMP gathers, at one velocity in the sweep are called a velocity sweep panel. The velocity sweep displays are again interpreted, in a manner similar to that described above, to produce a velocity versus time function. However, the velocity interpreter can usually pick better velocities from a velocity sweep display than from a semblance display, because:

The interpretation is based not only on discerning trace-to-trace coherency within a CMP gather, but also on the spatial (i.e., lateral) trace-to-trace coherency between the CMP locations. This spatial trace-to-trace coherency, rather than the coherency within a CMP gather, is much more important to the geologic interpreter when performing geologic interpretation of seismic data. Thus, optimizing spatial trace-to-trace coherency should be the primary goal of stacking velocity analysis.

The human eye can often observe optimal spatial trace-to-trace coherency in areas where poor signal-to-noise ratios make discerning optimal trace-to-trace coherency within a single CMP gather impossible.

Velocity sweep displays provide some geologic information that the velocity interpreter can use to separate signal from noise. For example, multiple reflections ("multiples") often have different dip than the primary geologic reflections one wishes to optimize.

Velocity Events Display

In order to improve the efficiency of the velocity interpretation process, velocity semblance or velocity sweep data are often pre-analyzed using an automatic picking program. See, for example J. H. Bodine, J. N. Gallagher, and J. H. Wright, "Geophysical Exploration Using Velocity Spectra Regional Coherency Peaks", U.S. Pat. No. 4,984,220 (1991). This automatic picking program searches the velocity semblance for peaks, and outputs a file containing only the time, velocity and coherency value of the peaks. These (time, velocity, coherency) data are called velocity "events" because each of them may represent reflected energy from a specific subsurface reflection or series of reflections. These data are plotted as a scatter plot with time as the vertical axis, velocity as the horizontal axis, and some aspect of the scatter symbol (e.g., color or size) used to indicate coherency. The automatically picked events themselves do not produce a satisfactory velocity function, because they are usually quite noisy. The events must be interpreted to produce a velocity function for the velocity analysis location.

Interpretation of Velocity Displays

After producing the velocity semblance, sweeps or events, these data are interpreted at each location in the survey individually. The only extra information, regarding adjacent velocity analysis locations, that is usually displayed are velocity functions that may previously have been picked at those adjacent locations. This conventional method for picking stacking velocities has several problems:

The simple fact that velocities must be analyzed at each location individually makes this a time consuming process.

Since the velocity interpreter cannot view the velocity analysis displays for a large region, it is difficult to pick velocities that do not have some unreasonable lateral velocity variations. Therefore, the interpreted velocity model must often be edited several times to remove these unreasonable lateral variations.

Velocity semblance and events displays show only coherency within a CMP gather, not spatial coherency. On the other hand, spatial coherency is the attribute that has primary importance to the geologic interpreter, and is more robust in the presence of low signal-to-noise ratios.

Velocity sweep displays have poor velocity precision, because they display panels of several traces for each velocity. This implies that only a few velocities (on the order of 25) can be displayed before the display becomes unwieldy.

Since conventional velocity analysis techniques use 2-D displays, with time being one dimension of the display, it is difficult to pick more than one "attribute" (i.e., any measurement based on seismic data, such as velocity, reflector dip or a non-hyperbolic moveout parameter) of the seismic data. The attribute that is usually picked is hyperbolic moveout velocity. Conventional methods have difficulty picking attributes beyond this hyperbolic moveout velocity, such as non-hyperbolic moveout parameters that may result from anisotropy or lateral velocity variation.

Bodine et al., in their patent referenced above, attempt to overcome the problem of unreasonably large lateral velocity variations. Their patent treats the velocity data, from one seismic line, as a cube with vertical axis being time, one lateral axis being velocity, and the other lateral axis being location along the seismic line. By extracting various slices from this cube, and interpreting those slices, they can produce smoother velocity models than those produced by the conventional method discussed above. However, their method has several shortcomings:

Since their method only works with slices of the data, the velocity interpreter is never presented with a single display that shows the velocity information corresponding to a large region. Thus, it is still difficult to produce velocities that vary smoothly in all dimensions.

For 3-D data, each "inline" in the 3-D volume would have to be analyzed individually by their method. Thus, it would be difficult to ensure that the velocity model is smooth in the direction perpendicular to the inline direction (i.e., the "crossline" direction).

The only attribute used by their method to pick velocity is coherency within CMP gathers. As discussed above, other attributes can be more diagnostic. In particular, spatial coherency is of primary interest to the geologic interpreter.

D. Doicin, C. Johnson and N. Hargreaves have presented an automated method for interpreting velocity events (EAEG/EAPG 57th Conference and Technical Exhibition, Glasglow, Scotland, Extended Abstracts Volume 1, 1995). In their method, velocity events are computed as in Bodine's above-referenced patent, except that they are computed at every time and spatial (x,y) position sampled in the seismic data. These events are then grouped together in a horizon-consistent manner, and any events that are not contained in a group having a lateral extent greater than a user-specified threshold are eliminated. Events falling outside of a user-specified window are also eliminated. Doicin, et al.'s method overcomes some of the problems discussed above. Since it is automatic, it reduces interpretation time analyzing the events, and precision isn't compromised due to display limitations. Their method also imposes some constraint on the spatial consistency of events, so that some of the unreasonably large lateral variations are eliminated. However, their method has the following limitations:

While they do use spatial coherency to eliminate events, they don't incorporate spatial coherency into their velocity events themselves. In low signal-to-noise ratio areas this will lead to missed events that could be visible to the human eye on a velocity sweep display.

Their events do not incorporate any spatial attributes (e.g. reflector dip)which can be very useful for discerning signal from noise.

They don't provide methods for quickly editing the results of their automated picking.

From the foregoing, it can be seen that an improved method for picking stacking velocities is needed. Such a method should be capable of presenting multiple attributes, including spatial coherency, for simultaneous interpretation, thereby generating better stacking velocity picks as well as enabling velocity picking to be performed in areas of poor signal-to-noise ratio. Such a method should make use of geologic "bias", such as expected variability in velocity, local reflector dip, and other seismic attributes over large subsurface regions, to discriminate the velocity of primary reflections from that of noise. Such a method should generate a globally consistent stacking velocity model in minimal time and at minimal expense, thus enabling more economic velocity interpretation of 3-D surveys. The present invention satisfies these needs.

SUMMARY OF THE INVENTION

The present invention is a method for determining stacking velocity parameters or other reflection geometry information from seismic data, which in one embodiment comprises the steps of: (a) computing the coherence, with respect to selected seismic attributes (e.g., moveout velocity, inline dip and crossline dip), of a set of adjacent common midpoint (CMP) gathers at selected subterranean spatial locations; (b) picking seismic events at the peaks of this coherence function; and (c) editing the picked events with the objective of eliminating all events except those representing primary seismic reflections. If a smooth velocity model is fitted to the edited events, the resulting velocities can be used for stacking the seismic data. Alternatively, the edited events can be used for other purposes such as input data for a tomographic velocity updating procedure. Preferably, step (b) is performed by automated means and step (c) is performed by a combination of automated means and human intervention.

In some embodiments, the coherence is calculated not only within each CMP gather, but also laterally between neighboring CMP gathers, thus mimicking by automated means the ability of the human eye to discern velocity events from noise in poor signal-to-noise areas and resulting in high quality event picking.

Velocity events produced by this method can have additional attributes (e.g., dip and coherence) which allow for quality control of the events not only based on coherence within a gather but also on the geologic consistency of events over larger regions.

In some embodiments of the present invention, the editing process is a combination of automated editing where events are deleted based on pre-set parameters and thresholds, and human intervention. Setting up the human editing, the automated process groups the events into sets characterized by smooth variations in their attributes over large regions. This grouping can be done by statistical means or by artificial intelligence means. The interpreter is then able to identify entire groups of events as corresponding to unwanted events such as multiple reflections, and accordingly delete them. The editing by the interpreter is greatly enhanced in the preferred embodiments of the present invention by the use of three-dimensional visualization techniques, which allow the interpreter to interpret velocities globally rather than one event at a time, thereby easily avoiding introducing unwanted rapid lateral velocity variations. The three-dimensional visualization display also presents more than one attribute at a time for the interpreter to consider.

BRIEF DESCRIPTION OF THE DRAWINGS

The present inventive method and its advantages will be better understood by referring to the following description and the attached drawings in which.

Figure 1:
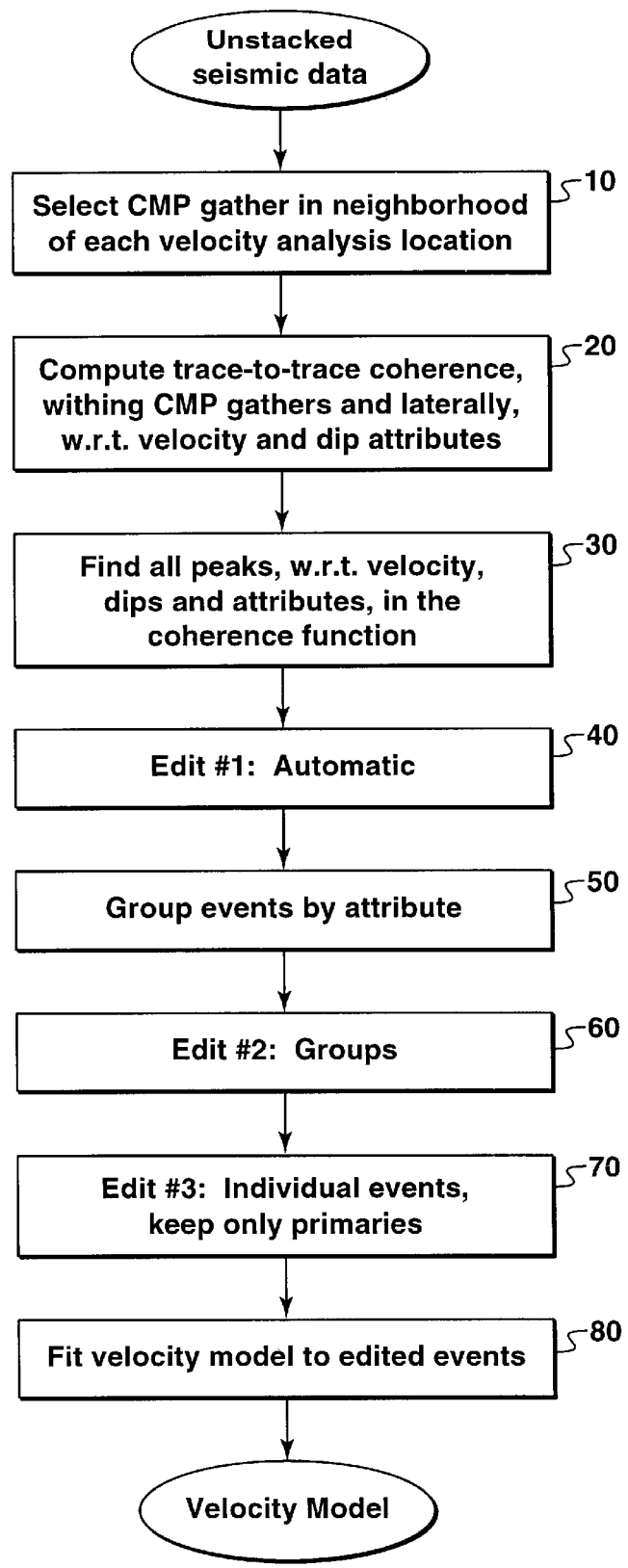
FIG. 1 is a flowchart illustrating the steps in one embodiment of the present inventive method.

The present inventive method will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that fall within the spirit and scope of the invention, as defined by the appended claims.

DETAILED DESCRIPTION OF THE PREFERRED EMBODIMENTS

The present invention in its preferred embodiments automates, suitable for software programming, some steps in the analysis used by human velocity interpreters when interpreting velocities from a velocity-sweep display. In particular, the following elements of the human analysis are mimicked by an automatic process:

The ability to pick velocity in poor signal-to-noise ratio areas based on discerning optimal spatial coherence of seismic reflections.

The ability to discriminate the velocity of primary reflections from that of noise based on geologic bias (i.e. based on the expected smoothness of velocity, local reflector dip, and other seismic attributes over large subsurface regions).

In a preferred embodiment, the present invention mimics the human interpretation of velocity sweeps because interpretations done on velocity sweeps are usually superior to those performed using semblance displays. Reproducing this type of interpretation using software has several advantages:

The time and cost for velocity interpretation are reduced.

Velocity sweep displays are limited to displaying very small regions of the seismic data. Thus, only a limited amount of geologic information can be incorporated into velocity picking by human interpreters. Computers can analyze the seismic data globally, since computer analysis is not limited by the size of display devices. Thus, more geologic bias can be incorporated into an automated velocity analysis procedure.

Global analysis of velocity data should make it possible to produce a good velocity model in one iteration, contrasted with conventional techniques which usually require multiple iterations to produce velocity models that do not have unwanted lateral velocity variability.

Automated analysis is not limited by 2-D displays; therefore, it is possible to use seismic attributes in addition to hyperbolic velocity, such as reflector dip or non-hyperbolic moveout parameters.

As discussed previously, velocity sweeps have limited velocity resolution. The reason for this limitation is mainly due to the limited size of display devices. Computer analysis is not limited by the size of display devices. Thus, more velocities can be included in the velocity sweep analysis, improving velocity resolution.

Even with the improvements expected by mimicking human interpretation of velocity sweeps, actual human interpretation at certain steps in the process can still be desirable. In particular, it may be difficult for the computer to separate signal from coherent noise. Therefore, the preferred embodiments of this invention utilize some human guidance. To facilitate this human guidance, further aspects of some embodiments of this invention include novel techniques for displaying the seismic velocity information in ways that a human interpreter can use to quickly guide the computer to a good velocity interpretation. In particular, 3-D visualization techniques are used in some embodiments to display seismic information from large subsurface regions. These displays also allow the human interpreter to visualize multiple attributes of the velocity information in one display. By basing the interpretation on these multiple attributes viewed over large subsurface regions, the quality of the velocity interpretation is greatly improved.

FIG. 1 is a flowchart illustrating the basic steps of one embodiment of the present invention where the seismic attributes to be interpreted are hyperbolic moveout velocity, inline dip and crossline dip, and the objective of the invention is to determine stacking velocities. At step 10, a set of unstacked seismic data traces is separated into common midpoint (CMP) gathers, from which a group of gathers is selected in the neighborhood of each of a set of preselected analysis locations. The preselected locations are usually a subset of the locations of the seismic traces, which in turn are fixed by the source and detector locations and spacings employed when performing the seismic survey. The spacing of the preselected locations should be fine enough to accurately represent the expected amount of lateral variability in the subsurface velocity. Because the objective is to determine a stacking velocity model in this embodiment of the present invention, the analysis locations will be called velocity analysis locations. At step 20, at each velocity analysis location the trace-to-trace coherence is computed. The coherence is computed both within the CMP gathers and laterally between the CMP gathers. This coherence is computed with respect to a range of values for the moveout velocity and the inline and (for 3-D surveys) crossline dips. Moveout velocity controls the computation of coherence within a CMP gather, while inline and crossline dip control the computation of spatial coherence between CMP gathers. The coherence can also be computed relative to any other parameters one wishes to estimate, such as non-hyperbolic moveout parameters. At this point in the process, one has both the within-gather coherence and the spatial coherence as a function in multi-dimensional (x, y, t, v, $dip_i$, $dip_x$, $a_1$, $a_2$...) space, where $dip_i$ and $dip_x$ represent inline and crossline dip, respectively, and $a_1$ and $a_2$ represent other parameters such as non-hyperbolic moveout, if desired. This multi-dimensional space will later be referred to as (x, y, t, attribute) space, where "attribute" here means all selected attributes except coherence. The vertical dimension can be represented either by the depth variable z or in terms of time t, which is what is measured in seismic data gathering.

After computing this coherence function, at step 30 all the peaks in the coherence function are located with respect to all of the attributes, i.e., with respect to all the independent variables except x and y. This produces a set of "raw" events that are represented by the location of the peaks, in the (x, y, t, attribute) space, and the coherence value associated with the peak. Since the coherence function includes the spatial coherence between CMP gathers, these events should be better than conventional velocity events. In essence they should mimic the ability of the human eye to detect coherence even in the presence of strong noise. Thus, this method picks velocity events in regions of the data where conventional velocity event picking methods would fail due to poor signal-to-noise ratio. The present inventive method in its preferred embodiments is capable of picking velocity events in portions of the data having a signal-to-noise ratio of less than 1.

One problem with conventional velocity events is that they keep track of the peaks in the coherence function, but not the width of the peak. This width is a measure of the velocity error. The present invention allows the peak width of the velocity events to be measured. This error information, for each event, is used in some embodiments when editing the events and also when producing a smooth velocity model that fits the events (see below) or for other applications such as velocity tomography.

The raw events will contain events corresponding to unwanted noise as well as events corresponding to the primary reflections. Also, the raw events will likely be more finely spaced than required for producing an accurate velocity model. Eliminating as many of the unnecessary events as possible will simplify further editing. Step 40 (FIG. 1) is the first editing step, and it employs simple techniques for weeding out unnecessary events including:

Delete events having coherence lower than a user-supplied threshold.

Delete events based on distance from an initial guess at the velocity function.

For events that are closer together than a user-supplied threshold, only the higher coherence events will be kept: This has the desirable effect of thinning out the over-sampled picks.

Delete events that have no nearby neighbors in the (x, y, t, attribute) space. These events are deleted because the character of primary reflections should not change extremely rapidly over a subsurface region of some significant size. If the character did change rapidly the seismic data would be geologically uninterpretable. Therefore, events corresponding to primary reflections should have neighbors that are nearby, not just spatially but also with respect to the attributes of the events such as velocity and dip.

Figure 2:
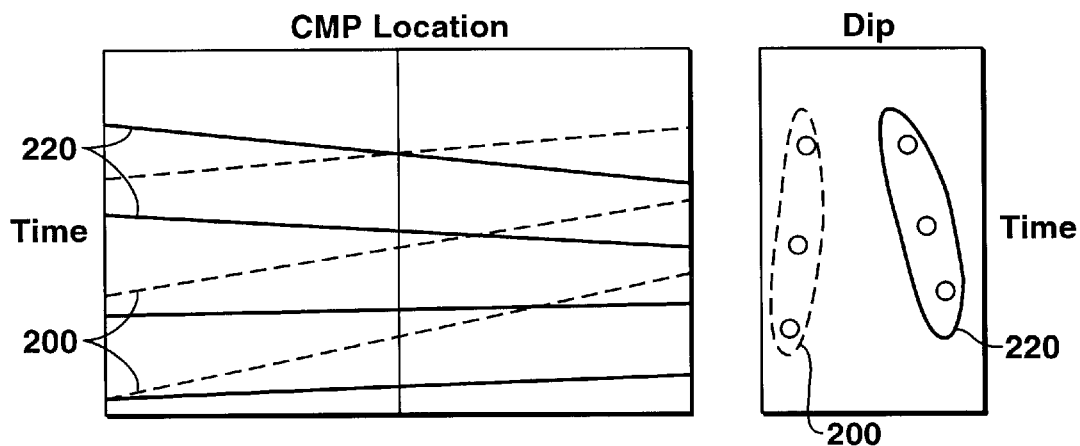
FIG. 2 is a schematic diagram demonstrating automated grouping of events into sets having smooth variation of the dip attribute at the velocity analysis locations, thereby enabling the interpreter to identify and edit out one grouping of events as corresponding to unwanted multiple reflections, and to identify and keep another grouping of events as corresponding to desired primary reflections.

After this initial editing, which will be done by automated means in the preferred embodiments of the present invention, the events will still contain a significant number of events corresponding to noise, such as multiples. At step 50, further event editing is facilitated by first automatically grouping the edited events into sets characterized by smooth variations in their attributes over large regions. The reason for grouping the events in this manner is that a given type of seismic arrival is expected to exhibit smooth variations in velocity, dip and other attributes over fairly large subsurface regions. FIG. 2 schematically illustrates this point for the temporal variation in the dip attribute. Because of their different reflection history, multiples 200 will often show a different dip than primaries 220, and this is illustrated in FIG. 2. The right panel in FIG. 2 displays the same information in dip-time space, where the multiples 200 now show up as separated from the primaries 220. The present invention in certain embodiments performs the grouping with respect to all available attributes which may include dip, velocity, and non-hyperbolic moveout. Different types of seismic arrivals can be expected to group into different sets. For example, multiples would tend to group into a low velocity set, while primaries would group at higher velocities.

Grouping of the events can be performed using statistical methods, or by using artificial intelligence methods. Both of these techniques will be familiar to persons skilled in the art.

After the events are grouped according to the smooth variation of their attributes, the velocity interpreter can quickly eliminate whole groups of events. This is done in step 60 (FIG. 1) by first displaying the groups of velocity events using an interactive 3-D visualization display (see more on 3-D visualization below). Based on the attributes common to the groups, the velocity interpreter selects a group of events, from the display, and eliminates it from further consideration. For example, in FIG. 2, the velocity interpreter can select the events 200 corresponding to multiple reflections and remove them from further consideration. Likewise the velocity interpreter can mark a group of events 220 as primaries to be kept. Before deciding to delete any data, the interpreter would probably look at how the same data may be grouped with respect to the other attributes besides dip. Until this human intervention at step 60, the present invention in its preferred embodiments is entirely automated.

The first two editing steps (steps 40 and 60) should eliminate the majority of the events that do not correspond to primary reflections. At step 70, the remaining events are edited on an individual basis. Whereas editing by group is done at step 60, in step 70 the interpreter looks within individual groups to cull individual events that do not make geologic sense. Again, the interpreter uses interactive 3-D visualization displays, discussed below, to select unwanted events and delete them.

After the above-described editing, all remaining events should correspond to primary reflections. At step 80, a velocity model is fitted to the remaining velocity events. This fit should account for the measured error of the velocity events, and should contain some smoothness constraints. There are a number of techniques for fitting a function to a volume of data, all known to persons skilled in the art. For example, one could use commercially available software programs such as the PetroCaem or Gocad programs to perform this fit. Gocad is licensed by T-Surf Corporation of Houston, Tex. PetroCaem can be licensed from CGG-Petrosystems of Houston, Texas. These programs produce a smooth velocity model that matches the input velocity events.

Another option, for fitting a model to the velocity events, is to use a manual model fitting procedure such as is disclosed in U.S. Pat. No. 6,253,157 entitled "Method for Efficient Manual Inversion of Seismic Velocity Information," with inventor J. R. Krebs.

The velocity model developed by the above-described embodiment of the present invention can be used to stack the seismic data.

Viewed more generally, the goal of picking stacking velocities is to define the geometry of reflections in seismic gathers. (Gathers are groupings of unstacked seismic traces that are related by some common parameter, e.g., a common image point or a common source location.) If the reflector geometry is assumed to be hyperbolic as a function of offset, then determining the reflection geometry would be the same as determining the stacking velocity. Going beyond the hyperbolic assumption, the reflection geometry measurement has broader applications. For example, the reflection geometry measurement could be used as data to be input to a tomographic velocity updating procedure that produces a migration velocity model. Alternatively, the reflection geometries can be used as measurements from which velocity anisotropy parameters can be derived. These are all among the possible uses for the present inventive method.

3-D visualization displays

The present invention in its preferred embodiments uses interactive 3-D visualization displays to facilitate editing the velocity events. These displays are designed such that on a single display they can:

Display many velocity events with the events in their correct geographic location.

Display the dip information of the events so that the velocity interpreter can distinguish primary reflection from noise events based on geologic bias.

Display other attributes of the events that are diagnostic for distinguishing signal from noise.

Display seismic sections so that the velocity events can be correlated with the seismic data.

Figure 3:
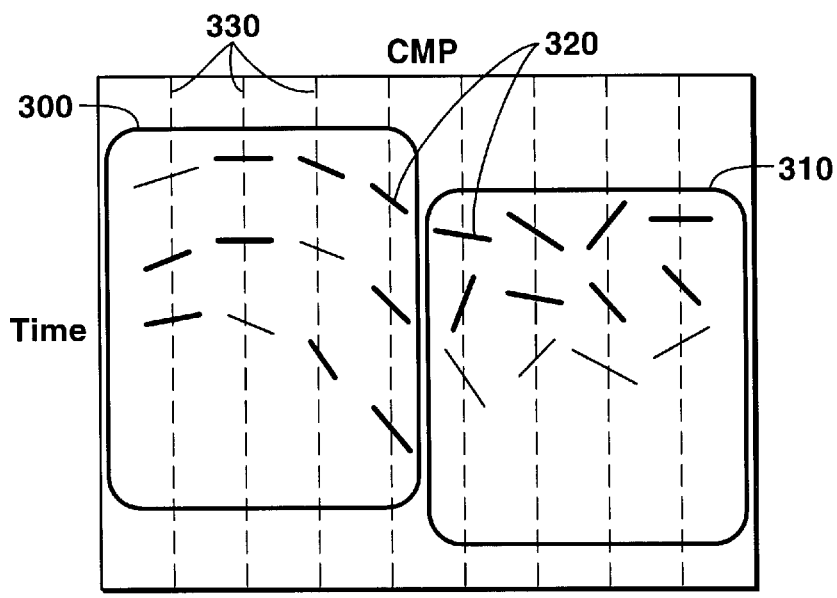
FIG. 3 is a schematic diagram of a two-dimensional version of the three-dimensional visualization displays that can be used in the present inventive method, with the display showing the dip of the events displayed graphically so that the velocity events can be interpreted geologically, enabling the interpreter to discern regions with good velocity events and also regions with bad velocity events, resulting in faster and higher-quality editing of the raw events.

A schematic diagram for a 2-D version of one such display is shown in FIG. 3. It shows velocity events 320 from different velocity analysis locations 330 in terms of the inline dip attribute. A 3-D visualization version of the same display can show both the inline and crossline dip over a 3-D region. The 3-D display would show events from velocity analysis locations covering the entire 3-D survey rather than just one line as is shown in FIG. 3. Color variations could be used to indicate the value of an attribute of the events, such as velocity.

Using the display shown in FIG. 3 the velocity interpreter can quickly determine which velocity events 320 are good (those in region 300) and which correspond to noise and should be discarded (those in region 310). This determination is based not only on the coherence within a gather, but also on the spatial coherence and how the events relate to each other geologically at adjacent velocity analysis locations. This geologic aspect of the display should allow for much faster editing of the velocity events and result in higher quality editing of the events. The combined spatial and within-gather coherence is encoded in FIG. 3 as the thickness (color could be used instead) of the dipping segments 320.

Seismic sections may be plotted in FIG. 3 as images in the background of the display. This allows one to correlate the events with the seismic data, to extract even more geologic information from the display.

Figure 4:
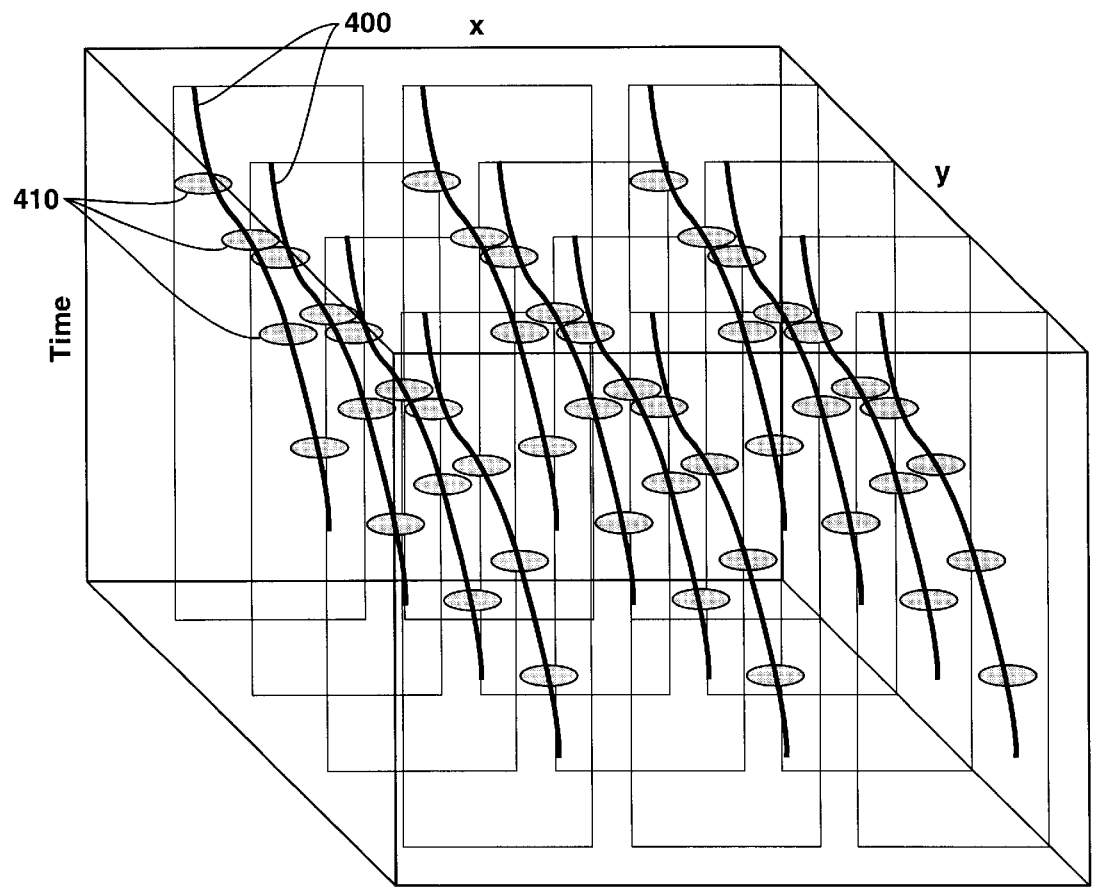
FIG. 4 is a simplified schematic diagram of a three-dimensional visualization display that can be utilized in the present inventive method for editing.

FIG. 4 is a schematic diagram for another type of display used in preferred embodiments of the present invention. This display is similar to the one shown in FIG. 3. The main difference is that the display in FIG. 3 can show only one extra attribute of the event, which is coded as the color of the event in the actual display, whereas the display in FIG. 4 can show two extra attributes. In the actual display represented by FIG. 4, one attribute is coded as the color of the event, depicted as contour ovals 410, while a second attribute is displayed as a scatter graph 400 with one axis being time and the other being the value of the attribute (RMS velocity, in the case of FIG. 4). Note that each scatter graph 400 is plotted at the appropriate geographic location for the velocity events 410. Note also that one could once again display the events as dipping segments as in FIG. 3, rather than as contour ovals. With, for example, inline dip shown in the x, t frame of each scatter plot, crossline dip in the y, t frame, velocity shown as indicated in FIG. 4, and coherence depicted through the color of the dip indicators, this display can simultaneously provide information for four event attributes. The viewer is able to rotate the 3-D coordinate frame so that any desired cross section is in the plane of the monitor screen. Thus, the reader who is experienced in the art will readily recognize that FIG. 4 is greatly simplified compared to the actual capabilities of current 3-D visualization technology.

These 3-D visualization displays are superior to conventional velocity analysis displays because they provide a geographically correct view of the events data over a large volume. This facilitates producing velocity models, in a single iteration, that do not have unreasonable lateral variations. These displays also present multiple attributes to the velocity interpreter that can be used to quickly distinguish signal from noise. In particular, by displaying reflector dip in the displays, the velocity interpreter can quickly determine whether a velocity event or a group of velocity events are consistent with geologic biases for the area.

OpenInventor and OpenGL are the names of two widely available 3-D visualization toolkits. They may be licensed from Silicon Graphics, Inc.

This discussion of the value of 3-D visualization displays in seismic event editing is not intended to imply that the dataset must be from a 3-dimensional seismic survey. Indeed, the present invention, including embodiments using 3-D visualization, works very well with 2-D datasets, with the understanding that as to the dip attributes, 2-D processing could use only inline (and not crossline) dip. A major value of the 3-D display is that it simultaneously presents multiple attributes for interpretation. In the case of a 2-D seismic dataset, one could, for example, make an (x, t, velocity, amplitude, inline dip) display. References herein to (x, y, t, attribute) space or the equivalent will be understood to mean (x, t, attribute) space for 2-D datasets.

Further Discussion

The foregoing description is directed to particular embodiments of the present invention for the purpose of illustrating the invention. It will be apparent, however, to one skilled in the art that many modifications and variations to the embodiments described herein are possible. For example, the grouping and editing steps described above can be simplified, or some eliminated, and the invention would still be useful due to features such as (1) the use of spatial coherence as a selection criterion, and (2) the additional attributes (such as dip and coherence) of the velocity events that can be produced by the present inventive method, which allow for quality control of the dip events based not only on coherence within a gather but also on the geologic consistency of the events over larger regions.

Similarly, although the main use of the present invention would be in connection with CMP gathers, the invention can obviously be extended to common-image point (CIP) gathers generated from prestack migration of seismic data, or other gather types generated during the processing of the seismic data.

All such modifications and variations are intended to be within the scope of the present invention, as defined in the appended claims.

What we claim is:

1. A method for constructing a velocity model for use in stacking a set of seismic data traces, said method comprising the steps of:

(a) separating said set of seismic data traces into a plurality of gathers of seismic data traces;

(b) selecting a plurality of velocity analysis locations and, for each such velocity analysis location
  (1) selecting a group of gathers in the neighborhood of said velocity analysis location,
  (2) determining a coherence function for said velocity analysis location with respect to a plurality of preselected seismic attributes by calculating the trace-to-trace coherence within each of said selected gathers and the spatial coherence between said selected gathers, said within-gather coherence being calculated at least with respect to seismic moveout velocity and said spatial coherence being calculated at least with respect to reflector dip,
  (3) determining a set of seismic events for said velocity analysis location by locating all peaks in said coherence function with respect to said preselected seismic attributes, and
  (4) editing said set of seismic events to determine a subset thereof containing primary reflections only; and
(c) adjusting the velocity coordinates of said edited seismic events at said selected velocity analysis locations as needed to produce a smooth velocity model for stacking said set of seismic data traces.

2. The method of claim 1, wherein said set of seismic data traces is obtained from a three-dimensional seismic survey, and wherein said spatial coherence between said selected gathers is calculated with respect to both inline reflector dip and crossline reflector dip.

3. The method of claim 1, wherein said coherence is also calculated as a function of a non-hyperbolic moveout parameter.

4. The method of claim 1, wherein said step of editing said set of seismic events to determine a subset thereof containing only primary reflections includes deleting events having a coherence below a preselected threshold.

5. The method of claim 1, wherein said step of editing said set of seismic events to determine a subset thereof containing only primary reflections includes deleting events having a value for at least one of said pre-selected seismic attributes falling outside of a pre-selected range for said attributes.

6. The method of claim 1, wherein said step of editing said set of seismic events to determine a subset thereof containing only primary reflections includes deleting events having a moveout velocity falling outside a preselected range of moveout velocities.

7. The method of claim 1, wherein said step of editing said set of seismic events to determine a subset thereof containing only primary reflections includes deleting events having no nearby neighbors in (x, y, t, attribute) space.

8. The method of claim 1, wherein said step of editing said set of seismic events to determine a subset thereof containing only primary reflections includes deleting lower coherence events among events that are closer together in (x, y, t, attribute) space than preselected thresholds.

9. The method of claim 1, wherein said plurality of gathers are common mid-point gathers.

10. The method of claim 1, wherein said step of editing said set of seismic events to determine a subset thereof containing only primary reflections comprises the following substeps:
  (i) deleting events, using an automated process, based on user-specified criteria or thresholds;
  (ii) grouping remaining events, using an automated process, such that said preselected seismic attributes vary smoothly with spatial position over large spatial regions for events in the same group; and
  (iii) deleting those of said groups of events that are interpreted by the user to represent other than primary reflections.

11. The method of claim 10, wherein said automated grouping of events is performed using statistical methods.

12. The method of claim 10, wherein said automated grouping of events is performed using artificial intelligence methods.

13. The method of claim 10, wherein said interpreting and deleting groups of events representing other than primary reflections is performed using three-dimensional visualization techniques.

14. The method of claim 1, wherein said step of editing said set of seismic events to determine a subset thereof containing only primary reflections comprises the following substeps:
  (i) deleting events, using an automated process, based on user-specified criteria or thresholds;
  (ii) grouping remaining events, using an automated process, such that said preselected seismic attributes vary smoothly with spatial position over large spatial regions for events in the same group;
  (iii) deleting those of said groups of events that are interpreted by the user to represent other than primary reflections; and
  (iv) deleting by the user of individual events within said groups of events based on geologic bias.

15. The method of claim 14, wherein said interpreting and deleting groups of events representing other than primary reflections is performed using three-dimensional visualization techniques.

16. The method of claim 14, wherein said deleting by the user of individual events based on geologic bias is performed using three-dimensional visualization techniques.

17. The method of claim 14, wherein said automated grouping of events is performed using statistical methods.

18. The method of claim 14, wherein said automated grouping of events is performed using artificial intelligence methods.

19. A method for determining primary reflections from a set of seismic data traces, said method comprising the steps of:
(a) separating said set of seismic data traces into gathers of seismic data traces; and
(b) selecting a plurality of analysis locations and, for each such analysis location
  (1) selecting a group of gathers in the neighborhood of said analysis location,
  (2) determining a,coherence function at said analysis location with respect to a plurality of preselected seismic attributes by calculating the trace-to-trace coherence within each of said selected gathers and the spatial coherence between said selected gathers, said within-gather coherence being calculated at least with respect to a seismic moveout parameter within each said gather and said spatial coherence being calculated at least with respect to reflector dip,
  (3) determining a set of seismic events for said analysis location by locating all peaks in said coherence function with respect to said preselected seismic attributes, and
  (4) editing said set of seismic events to determine a subset thereof containing primary reflections only.

* * * * *